US010784907B2

(12) United States Patent
Huang et al.

(10) Patent No.: US 10,784,907 B2
(45) Date of Patent: Sep. 22, 2020

(54) APPARATUS TO DETECT INTERFERENCE IN WIRELESS SIGNALS

(71) Applicants: Kee-dyi Huang, Cupertino, CA (US); Bhaskar Thiagarajan, Campbell, CA (US); Randy L Lundquist, Shelley, ID (US); Vaidyanathan Venugopal, Santa Clara, CA (US)

(72) Inventors: Kee-dyi Huang, Cupertino, CA (US); Bhaskar Thiagarajan, Campbell, CA (US); Randy L Lundquist, Shelley, ID (US); Vaidyanathan Venugopal, Santa Clara, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 0 days.

(21) Appl. No.: 15/431,671

(22) Filed: Feb. 13, 2017

(65) Prior Publication Data

US 2017/0222675 A1    Aug. 3, 2017

Related U.S. Application Data

(63) Continuation of application No. 12/258,172, filed on Oct. 24, 2008, now Pat. No. 9,571,142.

(51) Int. Cl.
*H04B 1/10* (2006.01)
*H04L 27/00* (2006.01)
*H04J 11/00* (2006.01)
*H04L 27/26* (2006.01)

(52) U.S. Cl.
CPC ........ *H04B 1/1036* (2013.01); *H04J 11/0023* (2013.01); *H04L 27/0006* (2013.01); *H04L 27/2628* (2013.01)

(58) Field of Classification Search
CPC combination set(s) only.
See application file for complete search history.

(56) References Cited

U.S. PATENT DOCUMENTS

| 5,144,642 | A  |   | 9/1992  | Weinberg |           |
|-----------|----|---|---------|----------|-----------|
| 5,151,919 | A  | * | 9/1992  | Dent     | H04B 1/71072 |
|           |    |   |         |          | 370/209   |
| 5,648,765 | A  | * | 7/1997  | Cresap   | G06K 7/0008 |
|           |    |   |         |          | 340/10.2  |
| 5,835,489 | A  | * | 11/1998 | Moriya   | H04B 1/7107 |
|           |    |   |         |          | 370/342   |
| 6,275,543 | B1 | * | 8/2001  | Petrus   | H04B 7/0851 |
|           |    |   |         |          | 343/893   |

(Continued)

OTHER PUBLICATIONS

Agilent AN 1314: Testing and Troubleshooting Digital RF Communications Receiver Designs: Application Note, Agilent Technologies, May 2000, 38 pages.

(Continued)

*Primary Examiner* — Zhiyu Lu
(74) *Attorney, Agent, or Firm* — Tucker Ellis LLP

(57) ABSTRACT

An apparatus to detect interference in wireless signals, comprising an antenna for receiving a wireless signal; and wherein the apparatus is operable to identify a dominant waveform in the received signal; subtract the dominant waveform from the received signal to create a modified received signal; and repeat the above steps, recursively substituting the modified received signal for the received signal, until all adjusted reference waveforms have been subtracted.

19 Claims, 9 Drawing Sheets

(56) References Cited

U.S. PATENT DOCUMENTS

| | | | |
|---|---|---|---|
| 6,571,089 | B1 | 5/2003 | Richards |
| 6,609,008 | B1* | 8/2003 | Whang ............... H04W 52/20 |
| | | | 370/318 |
| 7,379,724 | B2 | 5/2008 | Nilsson |
| 7,424,268 | B2 | 9/2008 | Diener |
| 7,460,837 | B2 | 12/2008 | Diener |
| 7,606,335 | B2 | 10/2009 | Kloper |
| 7,961,777 | B2* | 6/2011 | Nakanishi ......... H04L 25/03133 |
| | | | 375/224 |
| 9,571,142 | B2 | 2/2017 | Huang |
| 2002/0037737 | A1* | 3/2002 | Learned ............. H04L 25/0328 |
| | | | 455/526 |
| 2002/0094785 | A1 | 7/2002 | Deats |
| 2002/0126778 | A1 | 9/2002 | Ojard |
| 2003/0040277 | A1 | 2/2003 | Deats |
| 2003/0219069 | A1* | 11/2003 | Chen .................... H04B 7/1851 |
| | | | 375/227 |
| 2005/0037724 | A1* | 2/2005 | Walley ............... H04B 1/71075 |
| | | | 455/302 |
| 2005/0047493 | A1* | 3/2005 | Underbrink ........... G01S 19/215 |
| | | | 375/150 |
| 2006/0217080 | A1* | 9/2006 | Nguyen ............... H04B 1/1027 |
| | | | 455/84 |
| 2007/0091720 | A1* | 4/2007 | Woo .................... H04B 1/1027 |
| | | | 367/39 |
| 2008/0049600 | A1 | 2/2008 | Liu |

OTHER PUBLICATIONS

Agilent E7476A W-CDMA (UMTS) Drive Test System with E6455C IMT2000 Digital Receiver: Data Sheet, Agilent Technologies, Aug. 2001, 16 pages.

Xi UMTS/HSDPA, X-Tel Communications, Inc., Trend Test Communications, Inc., 2008, 2 pages, http://www.trendtestsystems.com/Trendweb/test/trendtestsystems.nsf/vlPageLookup/English%5E%5EProducts%5E%5EX-TEL+-+-Xi+UMTS-HSDPA+(TTS).

"Datasheet—Wireless Field Test," RF Scout Interference Hunter, Tektronix, 8 pages.

"Symphony Prizm Data Sheet," Symphony Scanning Receiver System, Comarco Wireless Test Solutions 2007, Revision B, 4 pages.

Wilson, K., "Audio-Video Array Source Separation for Perceptual User Interfaces," Workshops on Perceptual/Perceptive User Interfaces, Orlando, FL, Nov. 15-16, 2001, 7 pages.

Reyes-Gomez, M., "Audio: Model Based Source Separation," 2006, 3 pages, http://research.microsoft.com/~manuelrg/Audio_MBSS.html.

WCDMA/GSM (SeeGull® LX) Technical Specifications, Wireless Test Solutions, PCTEL: RF Solutions Group, Dec. 2006, Revision M, 2 pages.

R&S TSMQ Radio Network Analyzer, Rohde and Schwarz, Version 1.00, Feb. 2007, 8 pages.

SA2600: Field Spectrum Management: Application Note, Tektronix Communications, Jul. 2008, 12 pages.

"Drive Test: What causes unexpectedly high Ec values?" FAQ, Agilent Technologies, 2000-2008, 1 page, http://www.home.agilent.com/agilent/faqDetail.jspx?cc=US&lc=eng&ckey=1000003427:epsg:faq&nid=-11143.0.00&id=1000003427:epsg:faq.

SA2600 Handheld Real-Time Spectrum Analyzer: Product Video, Tektronix Communications, http://www2.tek.com/WMNoReg/applications/sa2600/SA2600_HI_BW.wmv, Screenshot of source URL: http://www.tek.com/products/spectrum_analyzers/sa2600/, 1 page.

Akmal, M. et al., "An Enhanced Modulated Waveform Measurement System for the Robust Characterization of Microwave Devices under Modulated Excitation", Proceedings of the 6th European Microwave Integrated Circuits Conference, © 2011, Oct. 2011, Manchester, UK, pp. 180-183.

Cunha, Telmo R. et al., "Characterizing Power Amplifier Static AM/PM with Spectrum Analyzer Measurements", IEEE © 2014, 4 pages.

Fager, Christian et al., "Prediction of Smart Antenna Transmitter Characteristics Using a New Behavioral Modeling Approach" IEEE® 2014, 4 pages.

Fager, Christian et al., "Analysis of Nonlinear Distortion in Phased Array Transmitters" 2017 International Workshop on Integrated Nonlinear Microwave and Millmetre-Wave Circuits (INMMiC), Apr. 20-21, 2017, Graz, Austria, 4 pages.

Martens, J. et al., "Towards Faster, Swept, Time-Coherent Transient Network Analyzer Measurements" 86th ARFTG Conf. Dig., Dec. 2015, 4 pages.

Martens, J., "Match correction and linearity effects on wide-bandwidth modulated AM-AM and AM-PM measurements" 2016 EuMW Conf. Dig., Oct. 2016, 4 pages.

Nopchinda, Dhecha et al., "Emulation of Array Coupling Influence on RF Power Amplifiers in a Measurement Setup", IEEE © 2016, 4 pages.

Pedro, Jose Carlos et al., "On the Use of Multitone Techniques for Assessing RF Components' Intermodulation Distortion", IEEE Transactions on Microwave Theory and Techniques, vol. 47, No. 12, Dec. 1999, pp. 2393-2402.

Ribeiro, Diogo C. et al., "D-Parameters: A Novel Framework for Characterization and Behavorial Modeling of Mixed-Signal Systems", IEEE Transactions on Microwave Theory and Techniques, vol. 63, No. 10, Oct. 2015, pp. 3277-3287.

Roblin, Patrick, "Nonlinear RF Circuits and Nonlinear Vector Network Analyzers; Interactive Measurement and Design Techniques", The Cambridge RF and Microwave Engineering Series, Cambridge University Press © 2011, entire book.

Rusek, Fredrik et al., "Scaling Up MIMO; Opportunities and challenges with very large arrays", IEEE Signal Processing Magazine, Jan. 2013, pp. 40-60.

Senic, Damir et al., "Estimating and Reducing Uncertainty in Reverberation-Chamber Characterization at Millimeter-Wave Frequencies", IEEE Transactions on Antennas and Propagation, vol. 64, No. 7, Jul. 2016, pp. 3130-3140.

Senic, Damir et al., "Radiated Power Based on Wave Parameters at Millimeter-wave Frequencies for Integrated Wireless Devices", IEEE © 2016, 4 pages.

\* cited by examiner

*600)* Reference Sequence aquired from published signal standard

B3A7CC05A98688E4

*602)* Modulated Ideal Waveform created using Reference Sequence

*604)* Interpolated and Oversampled Waveform based on Ideal Waveform

APPARATUS TO DETECT INTERFERENCE IN WIRELESS SIGNALS

CLAIM OF PRIORITY

This application is continuation of U.S. Pat. No. 9,571,142 entitled "APPARATUS TO DETECT INTERFERENCE IN WIRELESS SIGNALS", by Kee-dyi Huang, Bhaskar Thiaqaraian, Randy L. Lundquist, and Vaidyanathan Venuqopal.

BACKGROUND

Technical Field

The present invention relates to apparatus for detecting interference in wireless signals Related Art Signal interference is the inevitable result of the proliferation of wireless systems. Home networking, Bluetooth enabled devices, broadcast digital television, or even a microwave oven, can all contribute potential interference. Regulatory and environmental restrictions further compound these problems by limiting the distribution of new transmitter sites, forcing base station transceivers to share towers.

There are several apparatus on the market today designed to detect interference which may affect the quality of wireless signals. These apparatus include, for example, the Anritsu MT8222A Base Station Analyzer and the MS272xB line of Spectrum Analyzers, all available from Anritsu Company, Morgan Hill, Calif. These apparatus, among others, implement several methods of measuring and analyzing interference including measuring signal strength, received signal strength indication (RSSI), spectrograms, real-time scanning, and Error Vector Spectrum (EVS). However, when interference is weak enough to be buried under the spectrum of the desired signal and when the desired signal is present during the entire period of time that interference is present, current apparatus' ability to detect interference is weakened.

Thus, it is desirable to provide an apparatus for detecting interference in wireless signals.

SUMMARY

According to embodiments of the present invention, an apparatus is provided to detect interference in a received signal by modifying the received signal to remove sequentially deterministic components.

In one embodiment of the present invention, an apparatus can be configured to receive any wireless communication signal that includes sequentially deterministic components and to modify those wireless communication signals to detect interference that would otherwise be undetected. The sequentially deterministic components include portions of the signal that are made of predefined sequences. Examples of sequentially deterministic components include Pilot sequences in Code Division Multiple Access-based (CDMA-based) wireless technologies and Preambles in Worldwide Interoperability for Microwave Access (Wi-MAX). Because these components are predefined, they can be removed using ideal reference waveforms. The ideal reference waveforms are the ideal versions of the sequentially deterministic components for a given signal type of interest.

The received signal can be cross-correlated with the ideal reference waveforms to identify a dominant waveform and its characteristics in the received signal. The characteristics may include frequency, phase, and time offset and power. Using this information, the ideal reference waveform corresponding to the dominant waveform can be adjusted and subtracted from the received signal. This process can be repeated until no more dominant waveforms can be identified or until all reference waveforms have been subtracted. The resulting signal will be left with the interference that was previously undetectable. This can be analyzed using a spectrum analysis procedure to view the residual spectrum and identify possible sources of interference.

BRIEF DESCRIPTION OF THE DRAWINGS

Further details of the present invention are explained with the help of the attached drawings in which.

DETAILED DESCRIPTION

Figure 1:
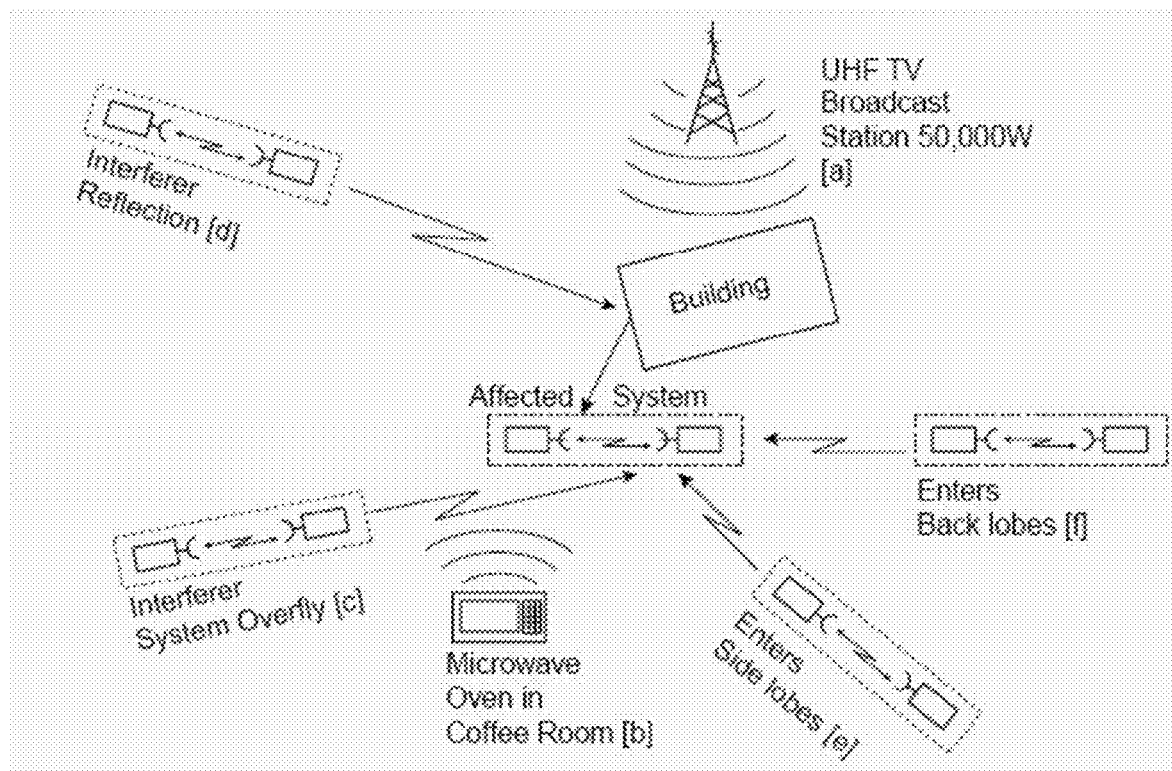
FIG. 1 shows a signal environment.

FIG. 1 shows a signal environment. As shown in FIG. 1, a system may receive many signals in addition to the desired signal. These additional signals, or sources of interference, can negatively affect the quality of the desired signal. For example, a microwave oven, 1b, may cause in-band interference if it is not shielded properly. Other sources, such as 1c, may overfly their intended receivers causing interference in the affected system. Other signals, such as 1e and 1f may be received through side or back lobes of the affected system's receiver. Additionally, nearby buildings can cause signals to be reflected to the affected system's receiver. These obstructions can also cause interference due to the intended signal being received from multiple paths causing signal degradation. Out-of-band signals can also cause interference. At 1a is a high-powered transmitter broadcasting ultra high frequency (UHF) television signals. While this signal may be out of band for the affected system, the signal may still leak through the system's filters causing distortion.

Figure 2:
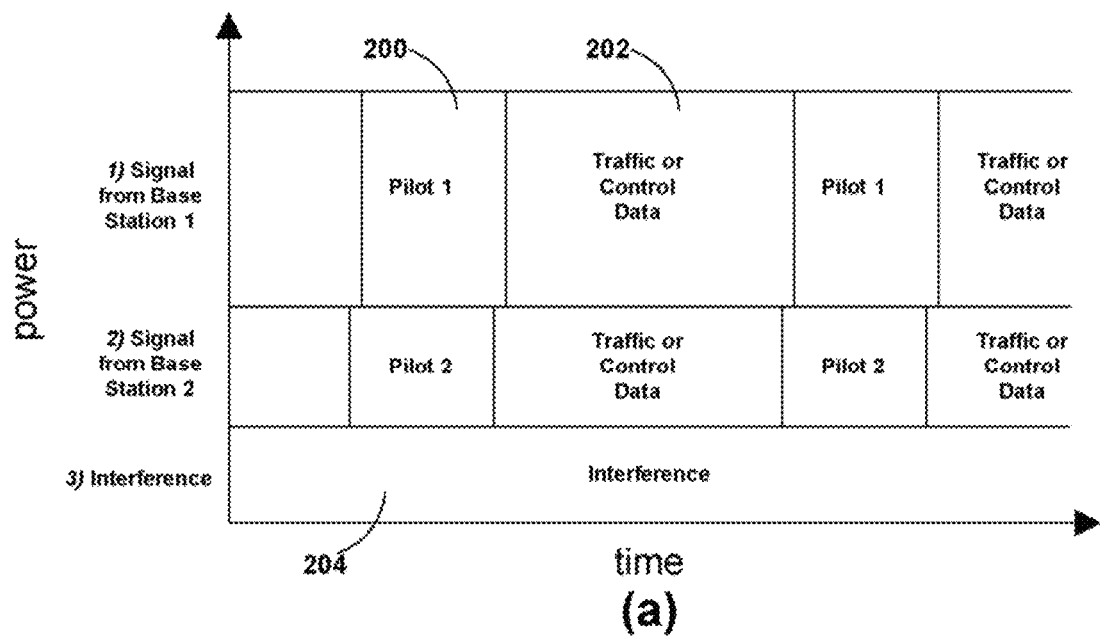
FIG. 2 shows a diagram of a wireless signal received by a user-device in accordance with an embodiment.
Figure 2:
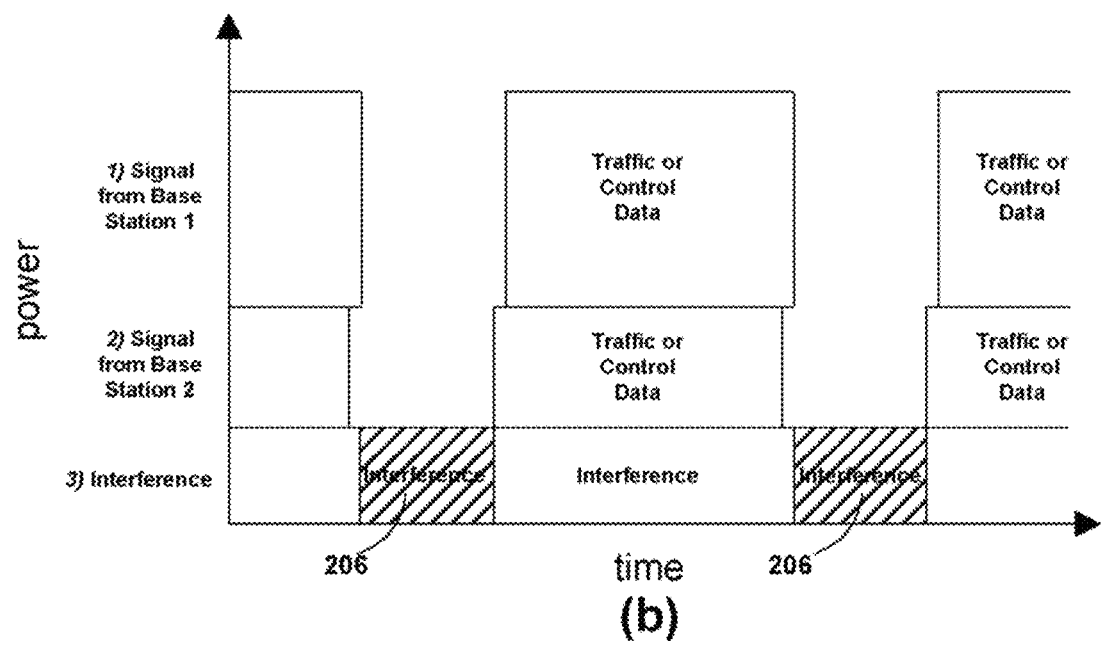

FIG. 2 shows a diagram of a wireless signal received by a user-device in accordance with an embodiment. A signal received by a user device may be made up of signals from one or more base stations operating in the same frequency channel. As shown in FIG. 2a, a user device is receiving signals from base station 1 and base station 2, in addition to unknown interference sources. Each signal includes a pilot component 200 and a data component 202. The pilot component is a time period where the signal includes sequentially deterministic components, in other words the signal for that time period is made up from a pool of pre-defined sequences. For Code Division Multiple Access-based (CDMA-based) technologies this is called the Pilot component. Other technologies may also include a sequentially deterministic component, for example in Worldwide Interoperability for Microwave Access (WiMAX) it is called the Preamble, and in Global System for Mobile Communications (GSM)/Enhanced Data Rates for Global Evolution (EDGE) it can be the Frequency Correction Burst (FCCH) in Broadcast Control Channel (BCCH) or Training Sequence Code in a traffic channel. While specific examples are noted above, this list is not exhaustive, and apparatus of the present invention are equally applicable to any signal that includes a sequentially deterministic component for a given time period. As further shown in FIG. 2b, if these sequentially deterministic components are removed from the signal received by the user device, then all that is left are the interfering signals 206.

Figure 3:
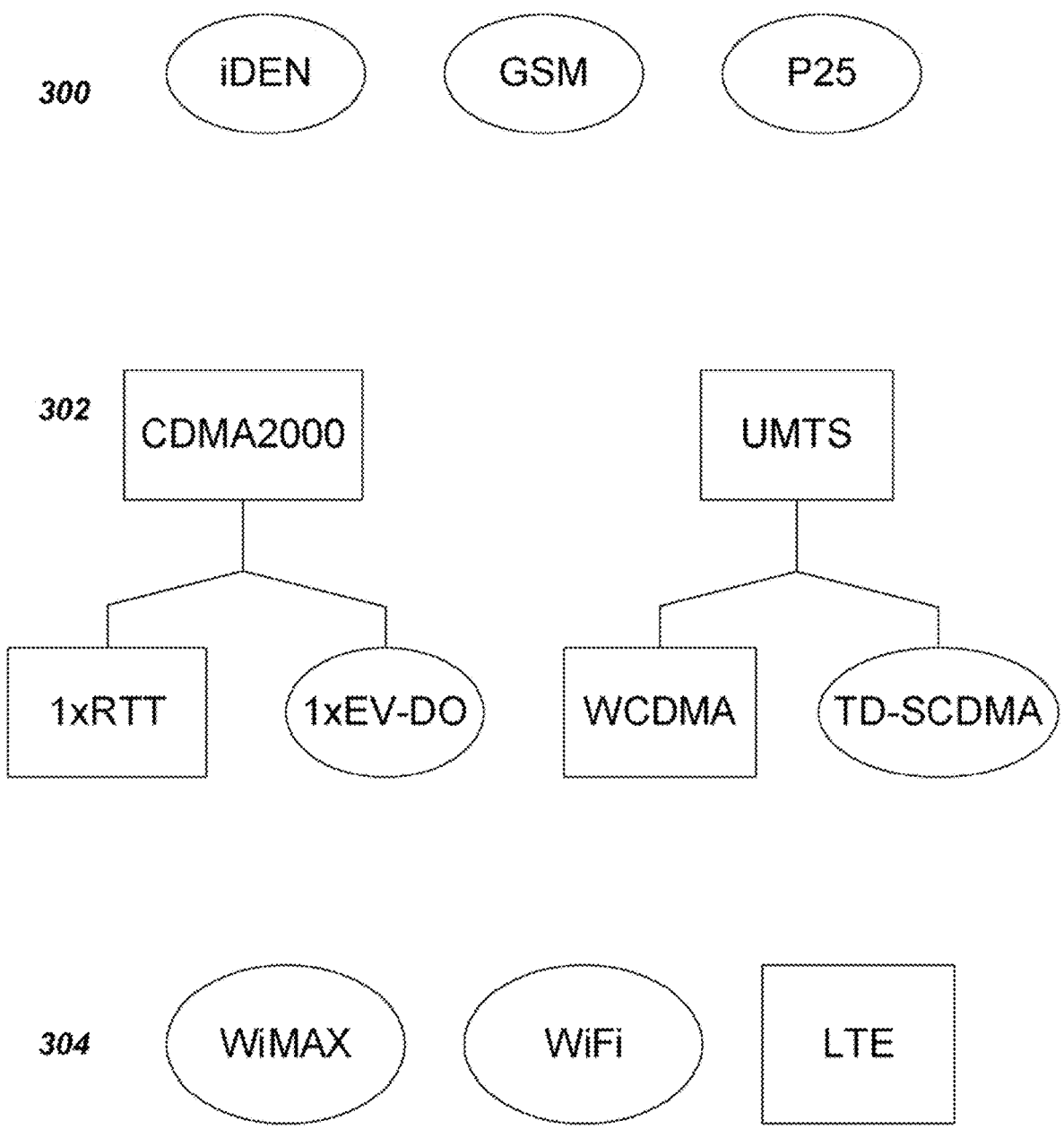
FIG. 3 shows a diagram of several wireless signal standards.

FIG. 3 shows a diagram of several wireless signal standards. As described above, any signal that includes a sequentially deterministic component for a given time period can be used with the present invention. While not exhaustive, FIG. 3 illustrates several signal standards, and differentiates between those which include this time domain multiplex characteristic and those which do not. At 300, Project 25 (P25), Integrated Digital Enhanced Network (iDEN), and GSM are listed. All of these standards are circled, indicating that they include the desired characteristic. At 302 are CDMA-based wireless technologies. These include Universal Mobile Telecommunications System (UMTS) and cdma2000. UMTS is a part of the International Telecommunications Union's vision of a global family of third generation (3G) mobile communications systems. Similarly, cdma2000 represents a family of technologies being implemented in North America and Asia, but not in Europe. Thus, as shown in FIG. 3, multiple signal standards are members of the UMTS and cdma2000 families. Both UMTS and cdma2000 families are referred to herein as CDMA-based technologies. Of the CDMA-based technologies listed, 1x Evolution Data Only (1xEV-DO) and Time Division Synchronous Code Division Multiple Access (TD-SCDMA) include sequentially deterministic components in the time domain and are circled. Finally, at 304, WiMAX, Wireless Fidelity (WiFi), and Long Term Evolution of Universal Terrestrial Radio Access Network (LTE) are shown. Of these, WiMAX and WiFi include this time domain multiplex characteristic. Apparatus of the present invention may be used with, among other signal standards, any of the above identified signal standards that include time domain sequentially deterministic components.

Figure 4:
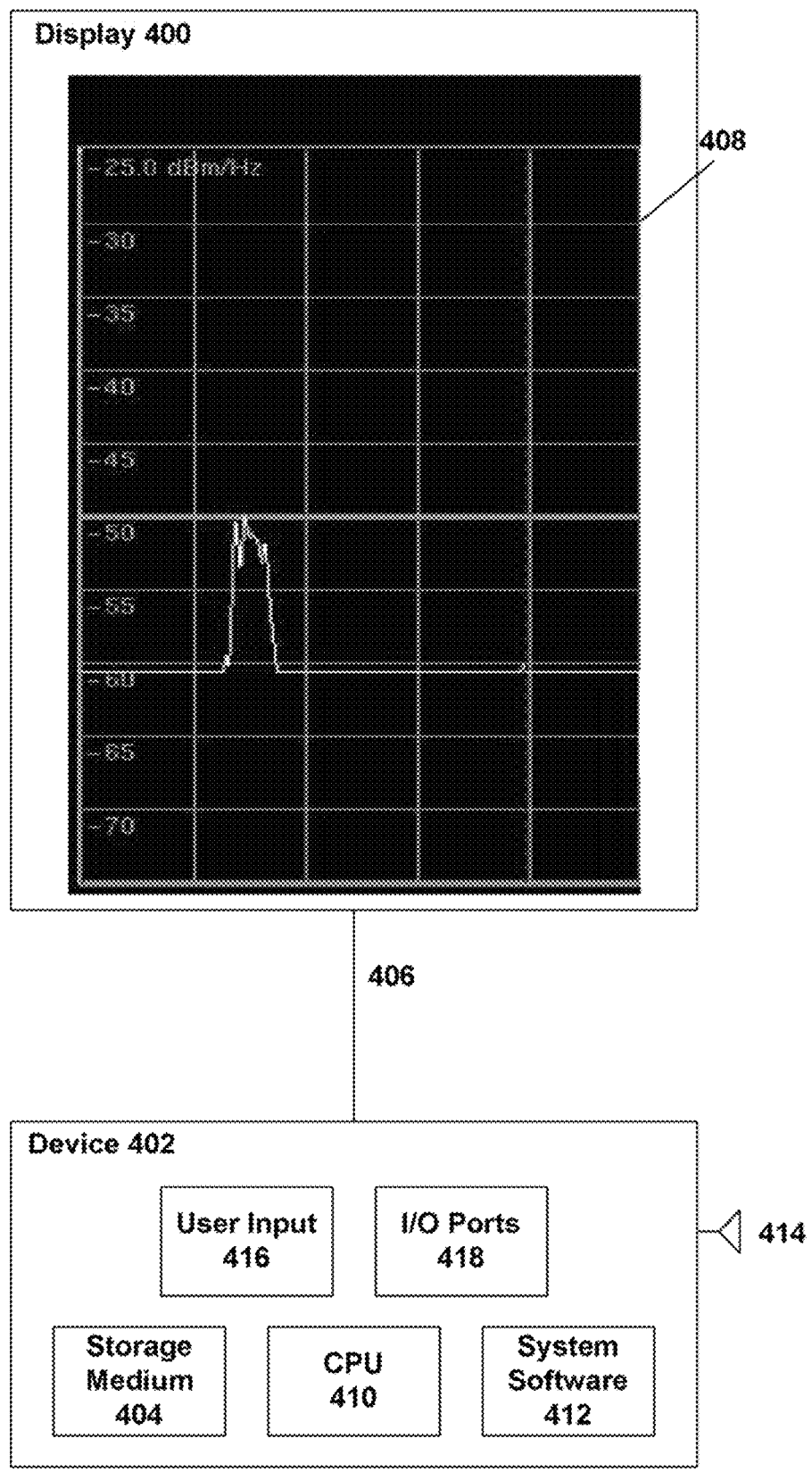
FIG. 4 shows a device in accordance with an embodiment.

FIG. 4 shows a high-level block diagram of an embodiment of the present invention. Such a device 402 may include a computer readable storage medium 404 and antenna 414 for receiving wireless signals, including cellular and wireless area network signals as described above. In one embodiment, the device is coupled 406 to a display 400. The device can be configured to display spectral analyses 408 of received wireless signals as well as results from various analyses of the received wireless signals. The computer readable storage medium 404 may include Flash memory. The device may also include a CPU 410 and stored system software 412. Additionally, the device may include a user input mechanism 416 including, but not limited to, soft keys and hard keys, touch screen, etc. The device may further include a variety of input/output (I/O) ports 418. These ports may include, for example, universal serial bus (USB) and Ethernet ports. In accordance with an embodiment, apparatus of the present invention may be implemented as hand-held devices that can be carried into the field, and bench-top devices which may offer increased performance or functionality at the expense of portability.

Figure 5:
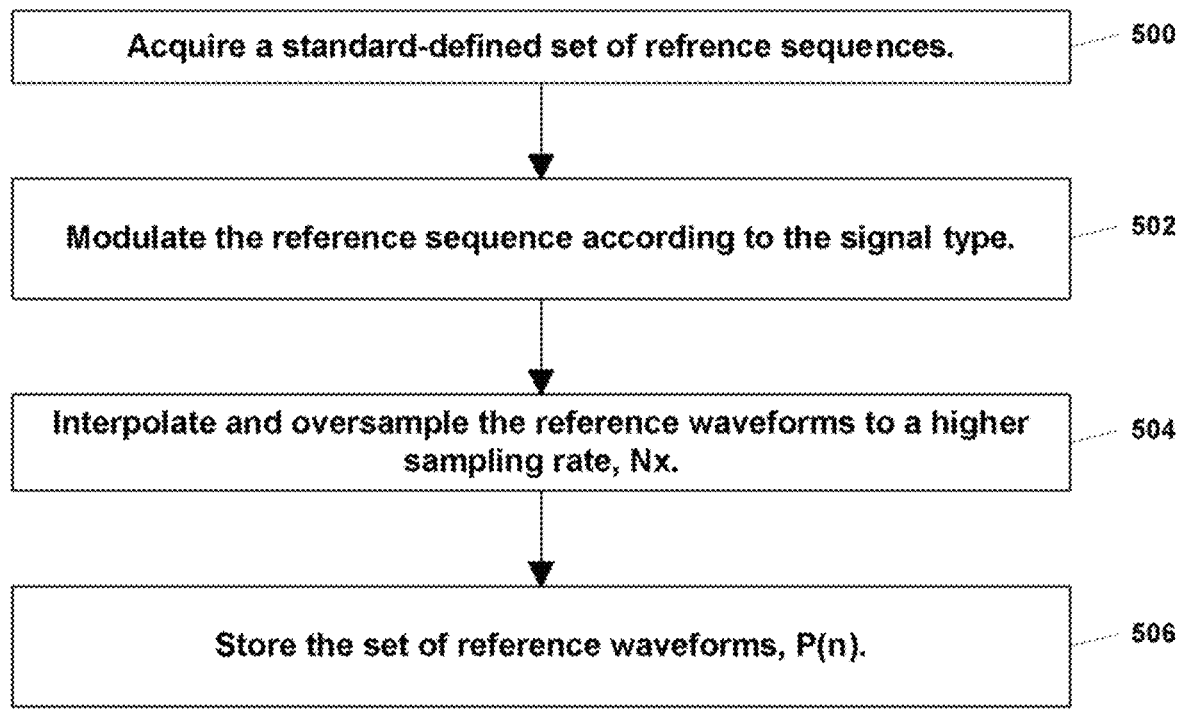
FIG. 5 shows a method for constructing ideal reference waveforms in accordance with an embodiment.

Apparatus of the present invention implement a method that removes the sequentially deterministic components of wireless communication signals to isolate weaker, interfering signals that would otherwise be hidden below the spectrum of the dominant signal(s). In one embodiment, a set of ideal reference waveforms are used to remove the sequentially deterministic components from the received signal. FIG. 5 shows a method for constructing ideal reference waveforms in accordance with an embodiment. This method may be performed by the apparatus to create a set of ideal reference waveforms, or it may be performed by another device and the resulting set stored on the apparatus. The ideal reference waveforms are the ideal sequentially deterministic components for a particular signal type of interest. For example, if the invention is applied to a CDMA-based signal with time domain multiplex characteristics, the set of ideal reference waveforms will include the ideal Pilot codes. At block 500, a set of standard-defined reference sequences are acquired. This set may be provided in the form of sequences of bits, or by a sequence generating formula, described in the signal standard's specification documents. At block 502, the reference sequences are modulated according to the signal type. A modulated waveform can be represented as two components, an in-phase (I) component, and a quadrature phase (Q) component that is 90 degrees out of phase from the in-phase component. The I and Q components are related such that the waveform at any given time is equal to I+Qj. The magnitude of the signal is given by |I+Qj| and its phase is given by ∠(I+Qj). This step may further include pulse-shaping, equalization, or conversion from the frequency domain to the time domain, depending on the signal type. At block 504, the waveforms are interpolated and oversampled to an Nx sampling rate. Oversampling is relative to the rate that is native to the standard-defined sequence, therefore 1x sampling rate is equivalent to the rate of the standard-defined sequence and Nx is the oversampled rate where N is greater than one. Interpolation and over-sampling are optional. By interpolating and over-sampling the ideal waveform, a waveform is created that more closely resembles the waveform one may receive in practice. At block 506, the set of ideal reference waveforms, P(n), are stored, n being the index of each reference waveform.

Figure 6:
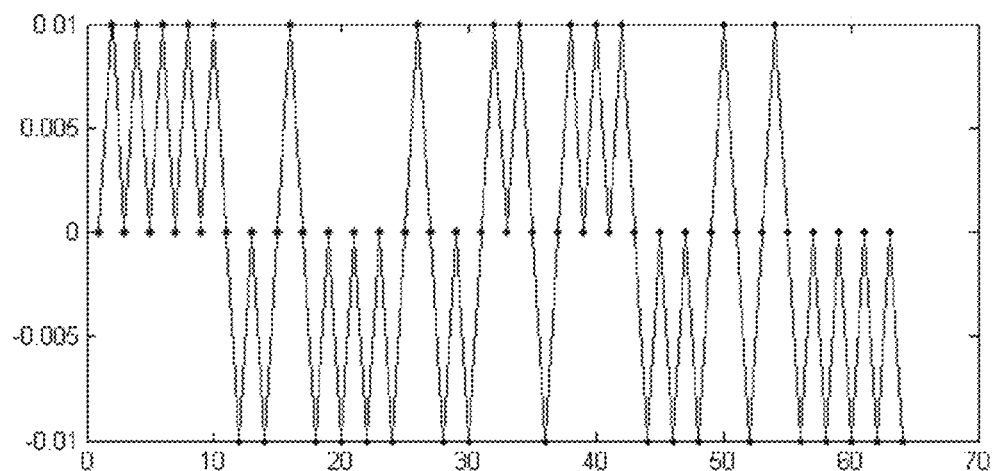
FIG. 6 shows an illustration of construction of ideal reference waveforms in accordance with an embodiment.
Figure 6:
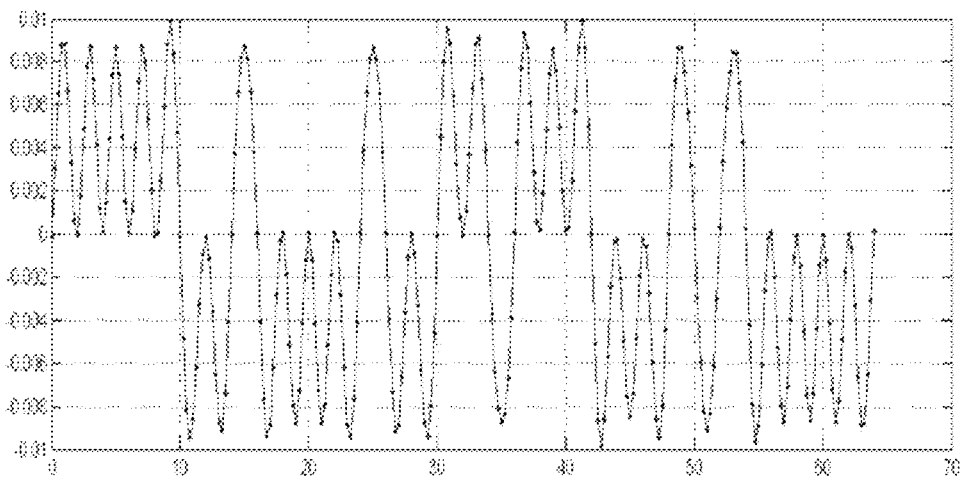

FIG. 6 shows an illustration of construction of ideal reference waveforms in accordance with an embodiment. At 600, a reference sequence is acquired. As shown at 600, this may be a hexadecimal sequence, however, other digital formats, such as binary sequences, may be used. Additionally, the sequence shown at 600 is just one sequence of thirty-two from the TD-SCDMA standard. As described above with respect to block 602, modulation of each reference sequence transforms the sequence of real numbers (as shown at 600) into a sequence of complex numbers representing the in-phase (I) and out-of-phase (Q) components of the reference waveform. At 602, the in-phase (I) component of the ideal waveform constructed from the reference sequence is shown. At 604, the I component of the ideal waveform is shown after being pulse-shaped and interpolated. The pulse-shaped and interpolated waveform more closely resembles a waveform that may actually be received in practice. As can be seen at 604, the pulse-shaped and interpolated waveform has been oversampled at a rate of 4x (i.e., in the nomenclature of FIG. 5, N=4). When compared with the waveform at 602, it is clearly seen that there are now four points in 604 for every point in 602. By using the interpolated and modulated waveform, the present invention is much more sensitive than apparatus of the prior art.

Figure 7:
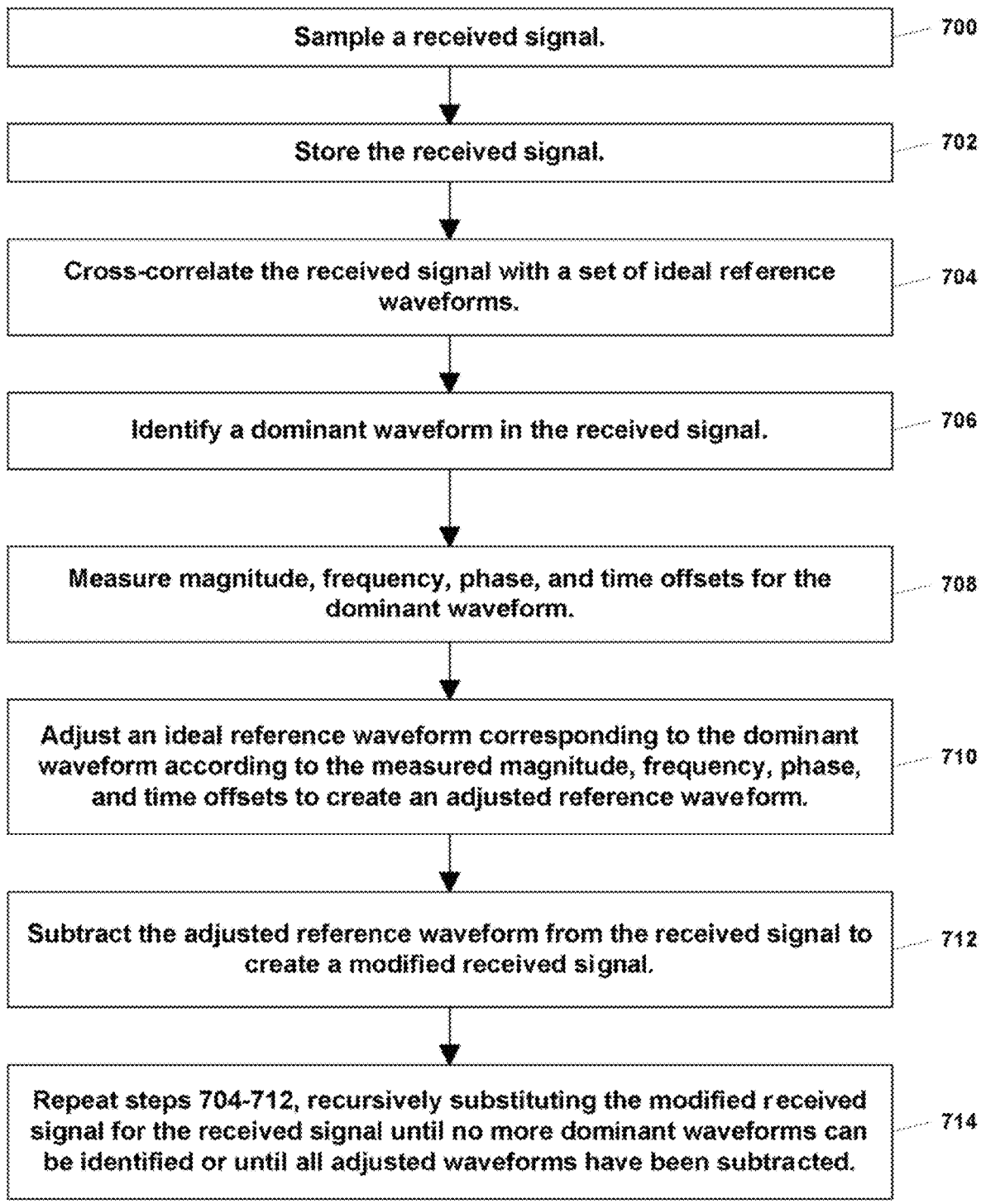
FIG. 7 shows a method for detecting interference in wireless signals in accordance with an embodiment.

Using the set of ideal reference waveforms constructed as shown in FIGS. 5 and 6, apparatus in accordance with an embodiment can implement a method for detecting interference in wireless signals. FIG. 7 shows a method for detecting interference in wireless signals in accordance with an embodiment. At block 700, a signal of interest is received by the apparatus using an antenna or other detection means and sampled. As noted above, embodiments of the present invention can be used with many signal types including CDMA-based signals such as TD-SCDMA and 1×EV-DO, WiMax signals, iDEN signals, GSM/EDGE signals, and any signal that for a period of time comprises sequentially deterministic components. The received signal is sampled at the same sampling rate (Nx) as described in FIG. 5. At block 702, the sampled signal, Rx(t), is stored in a computer readable storage medium in the apparatus. The sampled signal is stored as a complex sequence in the I and Q domain. At block 704, the received signal is cross-correlated with a set of ideal reference waveforms, P(n). The set of ideal reference waveforms is constructed according to the method described in FIG. 5. The result of the cross-correlation is a two dimensional array of complex numbers, C(t,n), which is a collection of the cross-correlation of each ideal reference waveform and the received signal.

Figure 8:
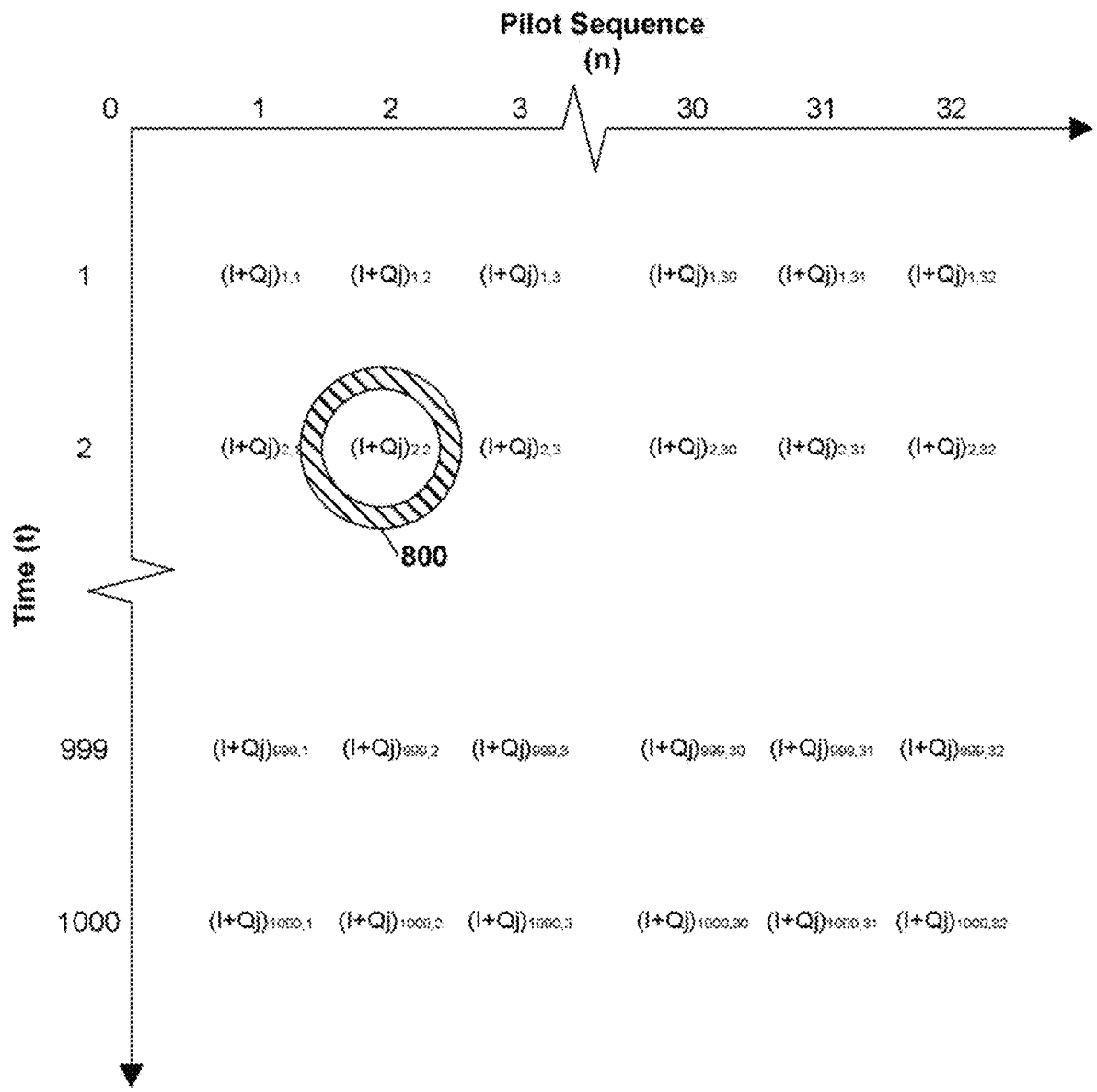
FIG. 8 shows an example of a cross-correlation of a sampled signal and a set of Pilot sequences.

FIG. 8 shows an example of a cross-correlation of a sampled signal and a set of ideal reference waveforms. In the example of FIG. 8, 32 ideal reference waveforms, P(n), have been cross-correlated with the sampled signal Rx(t). As described above, both the ideal reference waveforms and the sampled signal are stored as complex sequences in the I and Q domain. Accordingly, the resulting cross-correlation is a two dimensional array of complex values in the I and Q domain. Each column corresponds to a different ideal reference waveform, shown as 1 through 32. Each row corresponds to a different discrete time period, shown as 1 through 1000. Some values for C(t,n) will have a much higher magnitude than others. For example, in FIG. 8, at 800, C(2,2) has been identified as having the greatest magnitude, |C(2,2)|. Accordingly, P(2) identifies the dominant waveform and time 2 identifies the time period at which the dominant waveform starts. The phase offset can be measured by calculating the phase of C(2,2). The exact time offset can be obtained by fine time-shifting P(2) and correlating it with Rx(t) to find the maximum correlation value. Additionally, the frequency offset can be measured using conventional methods such as measuring the phase-time relationship of P(2) and Rx(t).

Returning to FIG. 7, at block 706, the dominant waveform is identified. The magnitude of C(t,n) is used to identify the dominant waveform. The magnitude associated with a time period, $t_k$, and a waveform, k, will be greater than other times and waveforms. Thus, $Rx(t_k)$ identifies the portion of the received signal that includes the sequentially deterministic components and P(k) identifies the ideal reference waveform corresponding to the dominant waveform. At block 708, the frequency, phase, time offset, and power of the dominant waveform are measured. These characteristics can be measured as described above with respect to FIG. 8. At block 710, the ideal reference waveform corresponding to the dominant waveform, P(k), is adjusted according to the measured frequency, phase, time offset, and power to create an adjusted reference waveform. Thus, if $C(t_1, 1)$ has the greatest magnitude of C(t,n) and is identified in block 706 as the dominant waveform, then P(1), the corresponding ideal reference waveform, is adjusted according to the measured characteristics of the dominant waveform creating $P_{adj}(1)$, an adjusted reference waveform.

At block 712, the adjusted reference waveform, $P_{adj}(k)$, is subtracted from the received signal, Rx(t), to create a modified received signal, Rx'(t). At block 714, steps 704-712 are repeated, recursively substituting the modified received signal, Rx'(t), for the received signal, Rx(t), until no more dominant waveforms can be identified or until all available reference waveforms have been subtracted. The resulting Rx'(t) is as shown at 206 in FIG. 2b, the reference waveforms have been removed leaving the interfering signal(s).

In one embodiment, a noise floor is estimated based on the cross-correlation of the sampled signal and the ideal reference waveforms. Some signal standards limit the total pool of waveforms that can be present in a signal at any time, therefore the noise floor can be estimated from the power of any waveforms detected in addition to the standard-set limit. Additionally, under signal standards where there is no set limit, physical limitations (such as geography) make the presence of a large number of waveforms unlikely. Therefore, the noise floor can be estimated based on the power of the weakest waveforms detected. Thus, if no waveform is detected with a peak-magnitude above the estimated noise floor, then no dominant waveform remains in the sampled signal.

In one embodiment, an apparatus can display each dominant waveform identified in block 706, along with its characteristics measured in block 708, providing a very sensitive reading of the waveforms present in the received signal. Thus, secondary signals, those waveforms identified as dominant after the first dominant waveform has been removed, may be detected with greater sensitivity in apparatus of the present invention than in conventional Base Station Analyzers.

In another embodiment, the results of the method can be used for spectrum analysis. As each dominant waveform is removed from the received signal, the spectrum analyzer can perform a Fourier transform on each resulting Rx'(t). Each spectrum, including the Residual Spectrum (i.e., the spectrum of the remaining signal after all dominant waveforms have been removed) can be displayed on the spectrum analyzer. Analysis can then be performed on the spectra to identify the source of the interference.

Figure 9:
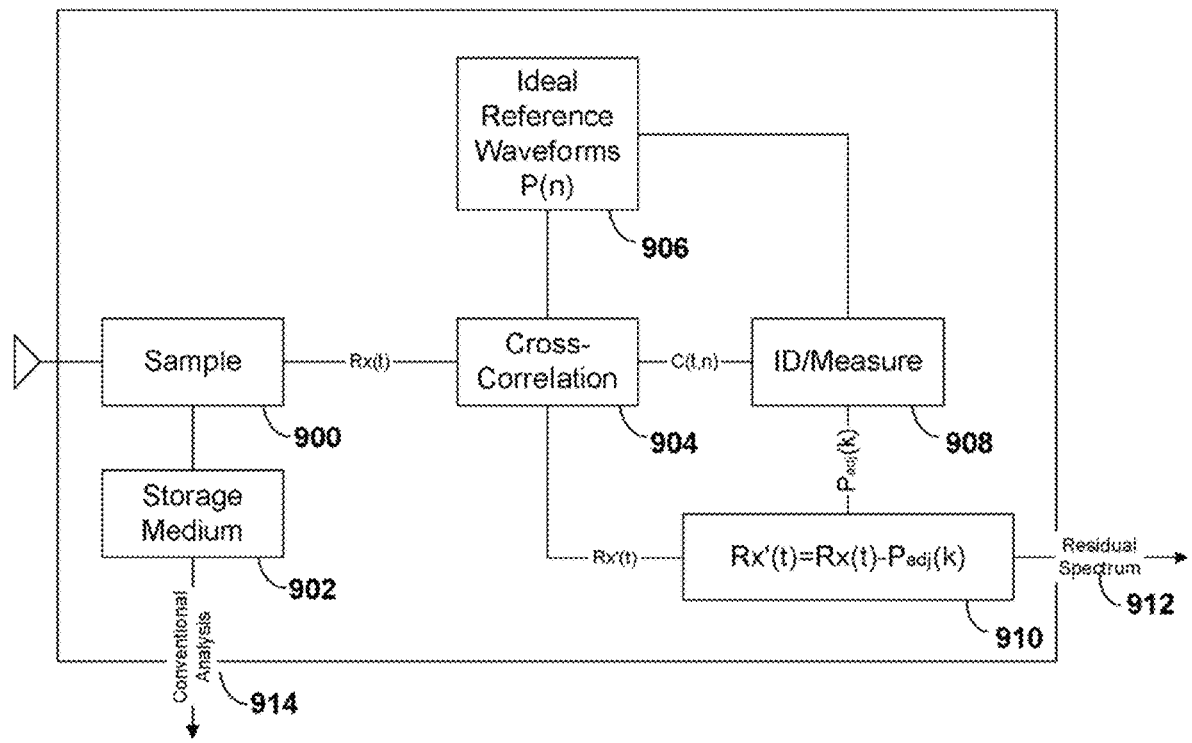
FIG. 9 shows a device in accordance with an embodiment.

FIG. 9 shows a more detailed block diagram of an apparatus for detecting interference in wireless signals in accordance with an embodiment. The apparatus includes sampling module 900 which samples a received signal, Rx(t), and stores the received signal in a storage medium 902. The sampled and stored signal can be used in conventional analyses 914. The sampling module then passes Rx(t) to a cross-correlation module 904. The cross-correlation module cross-correlates Rx(t) with a set of ideal reference waveforms, P(n), constructed as described above with respect to FIG. 5. The resulting array, C(t,n), is passed to an identification/measurement module 908 which identifies the dominant waveform, P(k), substantially as described above with respect to blocks 706 and 708 of FIG. 7. The ideal reference waveform corresponding to P(k) is adjusted based on the measured characteristics of P(k), including the frequency, phase, and time offset and power, creating $P_{adj}(k)$. This adjusted waveform is then passed to a subtraction module 910 where $P_{adj}(k)$ is subtracted from Rx(t) to create a modified received signal, Rx'(t). This modified received signal is then passed back to the cross-correlation module and the steps are repeated until all reference waveforms have been subtracted or until no dominant waveform remains. The resulting signal comprises the interference that was previously undetected. The result is passed to a display which shows a spectrum analysis of the result and analyzes the source(s) of the interference.

In one embodiment, the device may be configured to display the spectrum 912 of the signal that remains after the dominant waveforms have been removed, this is referred to as the Residual Spectrum. Additionally, a conventional spectrum analysis result (the original spectrum before any signal component is removed) may be superimposed in a different color on top of this Residual Spectrum trace for comparison purposes. An apparatus in accordance with an embodiment can use the Residual Spectrum to identify the source and signal type of the interfering signal.

Although the present invention has been described above with particularity, this was merely to teach one of ordinary skill in the art how to make and use the invention. Many modifications will fall within the scope of the invention, as that scope is defined by the following claims.

What is claimed:

1. An apparatus for identifying interference in signals received at an antenna, the apparatus comprising:
    a sampling module configured to sample a signal received at the antenna;
    a processor and a memory; and
    wherein the apparatus is configured to
        sample a signal received at the antenna over a length of time to obtain a sampled signal, wherein the sampled signal comprises a plurality of modulated waveforms at a plurality of different frequencies;
        store the sampled signal in the memory;
        retrieve a set comprising a plurality of reference modulated waveforms, wherein each reference modulated waveform is generated from a standard-defined reference sequence from which a signal source is identifiable;
        remove waveforms of identifiable signal sources at a plurality of different frequencies from the sampled signal stored in the memory by
            (a) identifying a dominant waveform in a particular time period of the sampled signal stored in the memory based on a degree of correlation of a modulated waveform of the sampled signal with a reference modulated waveform from the set of reference modulated waveforms,
            (b) removing the dominant waveform from the particular time period of the sampled signal stored in the memory to create a modified sampled signal stored in the memory, wherein removing the dominant waveform comprises
                measuring frequency, phase, and time offset and power for the dominant waveform,
                adjusting a reference modulated waveform corresponding to the dominant waveform according to the measured frequency, phase, and time offset and power to create an adjusted modulated waveform, and
                subtracting the adjusted modulated waveform from the particular time period of the sampled signal stored in the memory, and
            (c) repeating (a) and (b) a plurality of times, recursively substituting the modified sampled signal stored in the memory for the sampled signal stored in the memory, until all dominant waveforms correlating to the plurality of reference modulated waveforms have been removed from the sampled signal stored in the memory; and
        perform spectrum analysis of a remainder of the sampled signal stored in the memory, after all dominant waveforms correlating to the plurality of reference modulated waveforms have been removed, wherein said spectrum analysis applies a Fourier transform to said remainder and displays spectra of the remainder on a display in order to identify interference in said signal received at the antenna.

2. The apparatus of claim 1
    wherein each reference modulated waveform from the set of reference modulated waveforms is a complex sequence representing in-phase and out-of-phase components generated from a standard-defined reference sequence from which a signal source is identifiable; and
    wherein identifying a dominant waveform comprises:
        cross-correlating discrete time periods of the sampled signal with the set of reference modulated waveforms to generate an array of complex values representing in- phase and out-of-phase components over the sampled length of time; and
        identifying a waveform with a highest correlation value from the array of complex values above an estimated noise floor as the dominant waveform.

3. The apparatus of claim 1 wherein the set of reference modulated waveforms is constructed according to the steps of:
    acquiring a standard-defined set of reference sequences;
    modulating the reference sequences according to a signal type associated with the reference sequences to generate a set of initial reference modulated waveforms;
    interpolating and over-sampling the initial reference modulated waveforms to generate a set of reference modulated waveforms; and
    storing the set of reference modulated waveforms.

4. The apparatus of claim 1 further comprising an input means operable to receive input from the user selecting between spectral analysis and base station analysis and wherein in response to user input the apparatus performs the selected analysis.

5. A method of identifying interference in signals received at an antenna, the method comprising:
    sampling a signal received at the antenna over a length of time to obtain a sampled signal, wherein the sampled signal comprises a plurality of modulated waveforms at a plurality of different frequencies;
    storing the sampled signal in a memory;
    retrieving a set comprising a plurality of reference modulated waveforms, wherein each reference modulated waveform is generated from a standard-defined reference sequence from which a signal source is identifiable;
    removing a plurality of waveforms of identifiable signal sources at a plurality of different frequencies from the sampled signal stored in the memory by
        identifying a dominant waveform in a particular time period of the sampled signal stored in the memory based on a degree of correlation of a modulated waveform of the sampled signal with a reference modulated waveform from the set of reference modulated waveform s,
        removing the dominant waveform from the particular time period of the sampled signal stored in the memory to create a modified sampled signal, wherein removing the dominant waveform comprises
            measuring frequency, phase, and time offset and power for the dominant waveform,
            adjusting a reference modulated waveform corresponding to the dominant waveform according to the measured frequency, phase, and time offset and power to create an adjusted modulated waveform, and subtracting the adjusted modulated waveform from the particular time period of the sampled signal stored in the memory, and repeating the identifying and removing of a dominant waveform a plurality of times, recursively substituting the modified sampled signal stored in the memory for the sampled signal stored in the memory, until all dominant waveforms correlating to the plurality of reference modulated waveform s have been removed from the sampled signal stored in the memory; and performing spectrum analysis of a remainder of the sampled signal stored in the memory, after all dominant waveforms correlating to the plurality of reference modulated waveforms have been removed, wherein said spectrum analysis applies a Fourier transform to said remainder and displays spectra of the remainder on a display in order to identify interference in the signal received at the antenna.

6. The method of claim 5, wherein each reference modulated waveform from the set of reference modulated waveforms is a complex sequence representing in-phase and out-of-phase components generated from a standard-defined reference sequence from which a signal source is identifiable; and wherein identifying a dominant waveform comprises cross-correlating discrete time periods of the sampled signal with the set of reference modulated waveforms to generate an array of complex values representing in-phase and out-of-phase components over the sampled length of time, and identifying a waveform with a highest correlation value from the array of complex values above an estimated noise floor as the dominant waveform.

7. The method of claim 5, further comprising:

constructing the set of reference modulated waveforms by
acquiring a standard-defined set of reference sequences;
modulating the reference sequences according to a signal type associated with the reference sequences to generate a set of initial reference modulated waveforms;
interpolating and over-sampling the initial reference modulated waveforms to generate a set of reference modulated waveforms; and
storing the set of reference modulated waveforms.

8. A non-transitory computer readable storage medium, including instructions stored thereon which when read and executed by one or more computers of a measuring instrument cause the measuring instrument to perform the steps comprising:

sampling a signal received at an antenna over a length of time to obtain a sampled signal, wherein the sampled signal comprises a plurality of modulated waveforms at a plurality of different frequencies;

storing the sample signal in a memory of the measuring instrument;

retrieving a set comprising a plurality of reference modulated waveforms, wherein each reference modulated waveform is generated from a standard-defined reference sequence from which a signal source is identifiable;

removing a plurality of waveforms of identifiable signal sources at a plurality of different frequencies from the sampled signal stored in the memory by identifying a dominant waveform in a particular time period of the sampled signal based on a degree of correlation of a modulated waveform of the sampled signal with a reference modulated waveform from the set of reference modulated waveforms, removing the dominant waveform from the particular time period of the sampled signal stored in the memory to create a modified sampled signal stored in the memory, wherein removing the dominant waveform comprises measuring frequency, phase, and time offset and power for the dominant waveform, adjusting a reference modulated waveform corresponding to the dominant waveform according to the measured frequency, phase, and time offset and power to create an adjusted modulated waveform, and subtracting the adjusted modulated waveform from the particular time period of the sampled signal stored in the memory, and repeating the identifying and removing of a dominant waveform a plurality of times, recursively substituting the modified sampled signal stored in the memory for the sampled signal stored in the memory, until all dominant waveforms correlating with the plurality of reference modulated waveforms have been removed from the sampled signal; and performing spectrum analysis of a remainder of the sampled signal stored in the memory, after all dominant waveforms correlating to the plurality of reference modulated waveforms have been removed, wherein said spectrum analysis applies a Fourier transform to said remainder in order to identify interference in the signal received at the antenna.

9. The non-transitory computer readable storage medium of claim 8, wherein each waveform from the set of reference modulated waveforms is a complex sequence representing in-phase and out-of-phase components generated from a standard-defined reference sequence from which a signal source is identifiable; and wherein identifying a dominant waveform comprises cross-correlating discrete time periods of the sampled signal with the set of reference modulated waveforms to generate an array of complex values representing in-phase and out-of-phase components over the sampled length of time, and identifying a waveform with a highest correlation value from the array of complex values above an estimated noise floor as the dominant waveform.

10. The non-transitory computer readable storage medium of claim 8, including instructions stored thereon which when read and executed by one or more computers of a measuring instrument cause the measuring instrument to perform the further step comprising:

constructing the set of reference modulated waveforms by
acquiring a standard-defined set of reference sequences;
modulating the reference sequences according to a signal type associated with the reference sequences to generate a set of initial reference modulated waveforms;
interpolating and over-sampling the initial reference modulated waveforms to generate a set of reference modulated waveforms; and
storing the set of reference modulated waveforms.

11. The apparatus of claim 1, wherein:
the sampled signal is stored in the memory as a complex sequence of in-phase (I) components, and a quadrature phase (Q) components.

12. The apparatus of claim 1, wherein,
each of the plurality of reference modulated waveforms represents a signal which comprises one-or more predefined sequences for a time period.

13. The apparatus of claim 1, wherein,
each of the plurality of reference modulated waveforms includes sequentially deterministic components over a time period.

14. The method of claim 5, wherein:
storing the sampled signal in the memory comprises storing the sampled signal in the memory as a complex sequence of in-phase (I) components, and a quadrature phase (Q) components.

15. The method of claim 5, wherein,
each of the plurality of reference modulated waveforms represents a signal which comprises one-or more predefined sequences for a time period.

16. The method of claim 5, wherein,
each of the plurality of reference modulated waveforms includes sequentially deterministic components over a time period.

17. The non-transitory computer readable storage medium of claim 8, wherein:
storing the sampled signal in the memory comprises storing the sampled signal in the memory as a complex sequence of in-phase (I) components, and a quadrature phase (Q) components.

18. The non-transitory computer readable storage medium of claim 8, wherein,
each of the plurality of reference modulated waveforms represents a signal which comprises one-or more predefined sequences for a time period.

19. The non-transitory computer readable storage medium of claim 8, wherein,
each of the plurality of reference modulated waveforms includes sequentially deterministic components over a time period.

* * * * *